Jan. 11, 1938.  J. P. HEIL  2,105,320

SCRAPER

Filed Sept. 25, 1935

INVENTOR.
Julius P. Heil
BY
Morsell, Lieber & Morsell
ATTORNEYS.

Patented Jan. 11, 1938

2,105,320

UNITED STATES PATENT OFFICE 2,105,320

SCRAPER

Julius P. Heil, Milwaukee, Wis., assignor to The Heil Co., Milwaukee, Wis., a corporation of Wisconsin Application September 25, 1935, Serial No. 41,972

1 Claim. (Cl. 37—141)

The present invention relates in general to improvements in the art of excavating and transporting earth and mineral material, and relates more specifically to improvements in the construction and operation of mechanical scrapers especially adapted for digging and grading purposes.

It has heretofore been common practice in the construction of dirt handling scrapers, to provide an unbroken knife-like cutting edge at the forward portion of the advancing scraper bowl or scoop. While such a cutting edge is quite satisfactory when the scraper is operating upon relatively soft earth which is quite free from large stones and shale, the cutting edge is frequently damaged and excessive power is required when the edge is driven into contact with hard and obstructive rocks and between slabs of stone, because of the continuity and great width of the cutter. This difficulty becomes more serious with tractor drawn scraper units of large capacity, and such obstructions often cause serious damage and frequently stall the scraper propelling power unit.

I have discovered that these difficulties may, to a large extent, be overcome by providing local teeth or chisels at various places along the cutting edge of a scraper bowl. These chisel teeth preferably have relatively sharp cutting edges located a considerable distance in advance of and somewhat below the normal scraper edge with which they cooperate, and are also preferably formed wedge shape so as to lift slabby rock over the continuous cutter edge and into the bowl as the scraper moves forwardly. Both the local teeth and the cutting edge plate of the scraper bowl, are preferably made removable and independently renewable, and the chisel teeth may be constructed so that they will break and prevent damage to more costly portions of the scraper mechanism, in case an abnormal obstruction is encountered.

In view of the foregoing introduction, it will be apparent that the primary object of my present invention is to provide an improved scraper which is durable in construction, and which is moreover highly effective in use under relatively adverse conditions of operation.

Another object of the invention is to provide an improved transportable digging implement which combines the functions of an ordinary ripper with those of an ordinary scraper, and thereby eliminates the use of one relatively costly machine as well as increasing the speed of excavating and grading.

A further object of the invention is to provide a scraper edge assembly which can be forced through slabby rock and shale formations, with minimum power and with least danger of damaging the machine.

Still another object of the invention is to provide a cutter for scrapers or the like, the various wearing elements of which are readily and quickly renewable at minimum cost and with least loss of time.

These and other objects and advantages will be apparent from the following detailed description.

A clear conception of a practical embodiment of my invention, and of the mode of constructing and of operating scrapers built in accordance with the present improvement, may be had by referring to the drawing accompanying and forming a part of this specification in which like reference characters designate the same or similar parts in the various views.

While my invention has been illustrated and described herein as being specifically applied to a particular type of scraper having a material carrying bowl and a front apron adjustably associated with the bowl, it is not the intent to unnecessarily restrict the scope by such specific embodiment, since the improvement may obviously be more generally applied.

Figure 1:
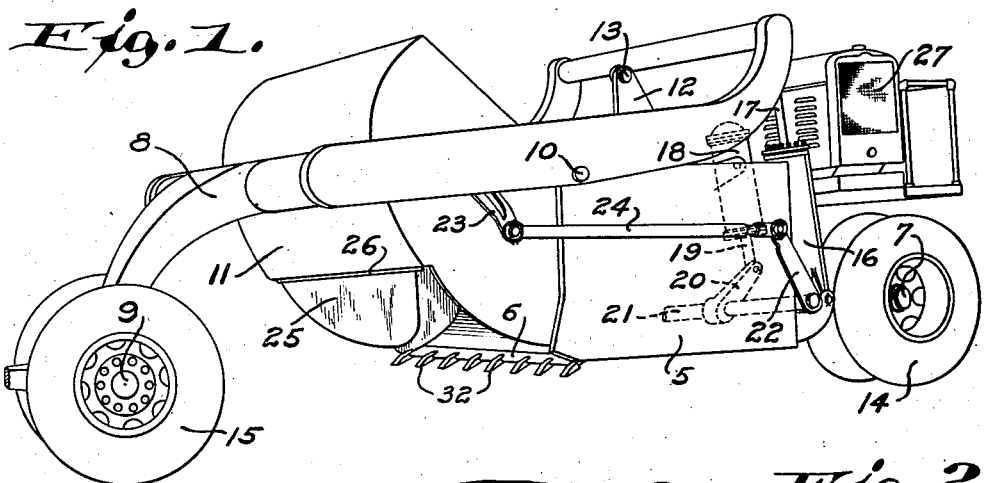
Fig. 1 is a perspective view of a scraper having a bowl provided with the improved cutter assembly.

The scraping mechanism illustrated in perspective in Fig. 1, comprises in general, a main carrier scoop or bowl 5 having a front cutter plate 6 and being adjustably suspended to swing about a rear axle 7; a substantially Y-shaped frame 8 movably supported to swing about a front axle 9 and extending rearwardly over the bowl 5 and having the medial portions of its side arms attached to the upper forward bowl portions by means of alined side pivots 10; a front apron 11 also supported upon the pivots 10 and swingable toward and away from the cutter plate 6; a rear apron 12 swingably suspended from a pivot 13 carried by the bowl 5 and movable through the bowl to eject the load; hydraulic jack mechanism for adjusting the bowl 5 and the aprons 11, 12;

and rear and front wheels 14, 15 associated with the axles 7, 9 respectively.

Figure 2:
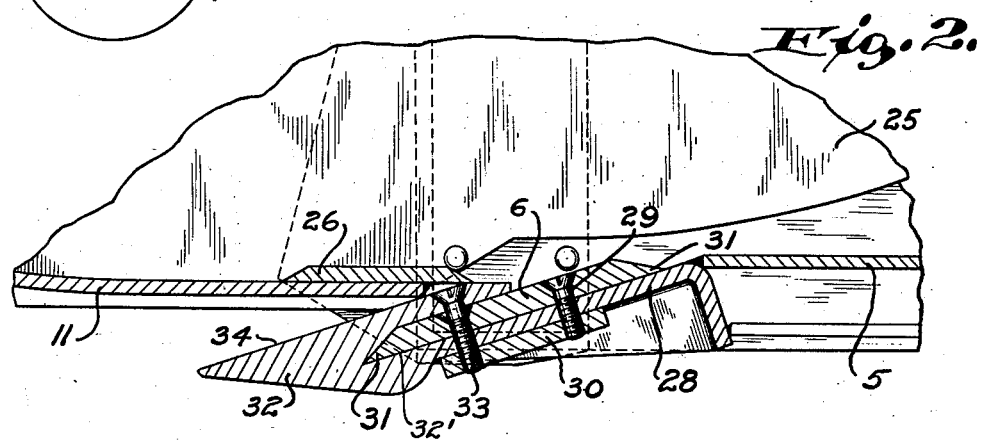
Fig. 2 is an enlarged longitudinal section through a fragment of the bowl and front apron of the scraper showing the parts in normal carrying position.
Figure 3:
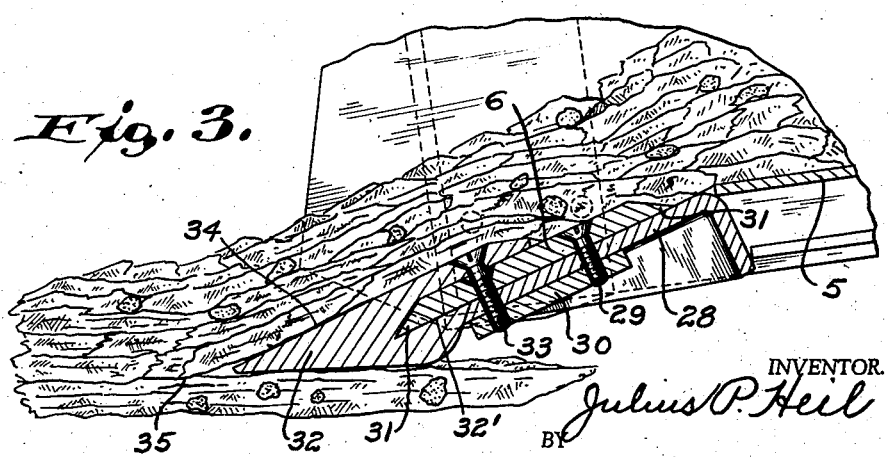
Fig. 3 is a similar section showing the cutter assembly in normal digging position.

The main bowl 5 is adapted to be raised to carrying position as shown in Fig. 2, or to be lowered into digging position as shown in Fig. 3, about the rear axle 7 as a fulcrum, by a pair of hydraulic jacks 16 having piston rods 17 coacting with the rear ends of the side arms of the frame 8. The front apron 11 is capable of being swung about its suspension pivots 10, by means of another hydraulic jack 18 the piston rod 19 of which coacts with a lever 20 carried by a cross-shaft 21 and having other levers 22 secured to its opposite ends, the swinging ends of the levers 21 being connected to side brackets 23 secured to the side plates of the apron 11 by adjustable rods 24. The front apron 11 has rearwardly extending integral side extensions 25 which are slidable along the internal side surfaces of the bowl 5, and the lower rear edge portion of the apron 11 is preferably provided with a relatively sharp edge plate 26 as shown in Figs. 2 and 3. The rear apron 12 is also provided with a hydraulic actuating jack, not shown, and these hydraulic jack mechanisms may be actuated by mechanism 27 disposed at the rear end of the scraper above the wheels 14.

The present improvement is best shown in Figs. 2 and 3, from which it will be noted that the front cutter plate 6 is removably and reversibly attached to the lower front portion 28 of the bowl 5, by means of screws 29 coacting with the plate 6 and with a lower plate member 30. The cutting edges 31 of the plate 6, either of which may be used interchangeably, extend entirely across the bowl 5 and are rectilineal. The plate 6 is inclined downwardly and forwardly, and the foremost portion thereof projects some distance forwardly beyond the lower front portion 28 of the bowl 5. A series of chisel teeth 32 which are formed with rear recesses 32' adapted to snugly engage the forwardly projecting portion of the plate 6, are positioned at spaced intervals across the front of the bowl; and these teeth 32 are removably attached to the plate 6 and bowl portion 28 by means of screws 33 coacting with rear extensions of the teeth, with the plate 6, with the bowl portion 28, and with the plate member 30. The screw holes in the cutter plate 6 are disposed so as to permit reversal of this plate, and the rear lower portions of the teeth 32 preferably directly engage the front of the bowl portion 28, as shown. The teeth 32 are preferably formed interchangeable, and have knife-like cutting edges and top rearwardly and upwardly inclined surfaces 34 which extend above the effective cutting edge 31 of the plate 6. This formation of the teeth 32 and disposition of the upper surfaces thereof, is important, since the forwardly advancing wedge shaped teeth 32 will thereby split stratified rock 35 and tightly compressed earth and will elevate the loosened upper strata over the simultaneously advancing cutting edge 31 of the plate 6, thereby relieving the plate 6 from excessive pressure which would be imposed thereon if this plate were called upon to do the original splitting.

During normal use of the improved scraper, the material receiving and carrying bowl 5 may be either elevated to carrying position as shown in Fig. 2, or lowered into digging position as shown in Fig. 3, or it may be disposed in any intermediate position, by manipulation of the hydraulic jacks 16. As the piston rods 17 of the jacks are lowered from the position indicated in Fig. 1, the frame 8 will swing downwardly about the front axle 9 and will thus drop the pivots 10 and permit the front end of the bowl 5 to swing downwardly about the rear axle 7. When the bowl 5 has been swung into digging position, the rear apron 12 should be moved back as far as possible, and the front apron 11 should be elevated as shown in Fig. 1 by manipulation of the hydraulic jack 18.

With the bowl 5 thus positioned for digging or scraping, forward movement of the scraper will cause the teeth 32 and the cutter plate 6 to advance beneath the ground surface. The forwardly projecting teeth 32 will then split the ground or rock 35 in advance of the front cutting edge 31 of the plate 6 and will initially lift the loosened material causing a portion thereof to ride upwardly along the inclined surfaces 34 of the chisel teeth. The simultaneously advancing intervening portions of the front blade edge 31 will subsequently engage the loosened material which has been initially acted upon by the teeth 32 and will cause all of the dirt and rock to enter the moving bowl 5. If the teeth 32 should engage a large unbreakable rock located in the path of travel of the scraper, beneath the center of the rock, the teeth will pry the obstruction loose and will roll it over the cutter plate 6. If the engagement between the teeth 32 and the rock, is above the center of the latter, the teeth will ride upwardly over the obstruction and will lift the bowl 5 sufficiently so that the cutting edge 31 will not strike the rock squarely. The teeth 32 should be spaced rather closely along the plate 6 in order to provide relatively short intervening gaps between successive teeth, for the cutting edge 31 of the plate 6 to act upon, and if one of these teeth 32 should be accidentally broken, it may be readily and quickly replaced by merely removing the clamping screw 33 which normally holds the broken tooth in position. When the active cutting edge 31 of the plate 6 becomes excessively dull and worn, the plate 6 may be conveniently removed and either reversed or replaced by merely withdrawing the screws 29, 33.

From the foregoing description, it will be apparent that the present invention provides an improved scraper structure which functions to effectively rip the material from its normal anchorage, and to subsequently load and transport the removed earth and rock, without danger of readily damaging the normal cutting edge, and with minimum power consumption. It has been found that a machine provided with the present improvement obviates necessity of utilizing a ripper in order to initially loosen the soil and rocks, thereby materially reducing the machinery expense of grading contractors. The formation of the teeth 32 and the mode of attachment thereof to the scraper bowl 5, is such that the normal cutting edge 31 is considerably relieved from pressure and cutting duty, thereby reducing the repair expense to a minimum; and if for any reason, the presence of these chisel teeth 32 is objectionable, they can be quickly removed without great difficulty. The knife edge 26 of the front apron 11 is so formed and located, that it will effectively cooperate with the upper surfaces 34 of the teeth 32 to retain the material within the scraper bowl 5, and the invention has proven highly successful in actual operation even for the purpose of simultaneously ripping and removing paving material from roads which required resurfacing.

While the present disclosure includes certain novel features of scraper construction which are not specifically claimed herein, these form no part of my present application and will be made the subject of other applications. It should also be understood that it is not desired to limit the present invention to the exact details of construction and to the precise mode of operation herein shown and described, for various modifications within the scope of the claim may occur to persons skilled in the art.

I claim:—

In a scraper, a bowl provided with an inclined bottom having a front substantially vertical end surface movable along the ground, a plate of uniform transverse cross-section secured to said bottom and having a continuous rectilinear scraping edge provided with a more abruptly inclined elevating surface projecting forwardly beyond said bowl end, a plurality of laterally spaced teeth each having a recess snugly fitting the adjacent forwardly projecting plate edge portion, and common fastening means for securing said plate and said teeth to said bowl, each of said teeth having an elevating surface inclined less than the elevating surface of said scraping edge and also having a rear portion abutting directly against said bowl end to relieve said attaching means of shearing stress.

JULIUS P. HEIL.